US008849649B2

(12) United States Patent
Duong-van (10) Patent No.: US 8,849,649 B2
(45) Date of Patent: Sep. 30, 2014

(54) SYSTEM AND METHOD FOR DETERMINING SENTIMENT EXPRESSED IN DOCUMENTS

(75) Inventor: Minh Duong-van, San Diego, CA (US)

(73) Assignee: Metavana, Inc., San Francisco, CA (US)

( * ) Notice: Subject to any disclaimer, the term of this patent is extended or adjusted under 35 U.S.C. 154(b) by 950 days.

(21) Appl. No.: 12/977,513

(22) Filed: Dec. 23, 2010

(65) Prior Publication Data

US 2011/0161071 A1 Jun. 30, 2011

Related U.S. Application Data

(60) Provisional application No. 61/393,813, filed on Oct. 15, 2010, provisional application No. 61/284,820, filed on Dec. 24, 2009, provisional application No. 61/284,819, filed on Dec. 24, 2009.

(51) Int. Cl.
*G06F 17/27* (2006.01)

(52) U.S. Cl.
CPC .................................. *G06F 17/2785* (2013.01)
USPC ............................................. 704/9; 707/709

(58) Field of Classification Search
USPC ............................................. 704/9; 707/709
See application file for complete search history.

(56) References Cited

U.S. PATENT DOCUMENTS

| | | | | |
|---|---|---|---|---|
| 2006/0069589 A1* | 3/2006 | Nigam et al. | ...................... | 705/1 |
| 2006/0200341 A1* | 9/2006 | Corston-Oliver et al. | ........ | 704/5 |
| 2006/0253316 A1* | 11/2006 | Blackshaw et al. | ............. | 705/10 |
| 2007/0033188 A1* | 2/2007 | Levy et al. | ........................ | 707/7 |
| 2007/0282867 A1* | 12/2007 | McAllister et al. | ........... | 707/100 |
| 2008/0195595 A1* | 8/2008 | Masuyama et al. | ............... | 707/5 |
| 2008/0249764 A1* | 10/2008 | Huang et al. | ...................... | 704/9 |
| 2008/0270116 A1* | 10/2008 | Godbole et al. | ................... | 704/9 |
| 2008/0313130 A1* | 12/2008 | Hammond et al. | ............... | 707/2 |
| 2009/0030862 A1* | 1/2009 | King et al. | ...................... | 706/45 |
| 2009/0048823 A1* | 2/2009 | Liu et al. | ........................... | 704/9 |
| 2009/0119281 A1* | 5/2009 | Wang et al. | ...................... | 707/5 |
| 2009/0125371 A1* | 5/2009 | Neylon et al. | ................... | 705/10 |
| 2009/0193328 A1* | 7/2009 | Reis et al. | ...................... | 715/231 |
| 2009/0319518 A1* | 12/2009 | Koudas et al. | .................... | 707/5 |
| 2010/0023311 A1* | 1/2010 | Subrahmanian et al. | ......... | 704/2 |
| 2010/0119053 A1* | 5/2010 | Goeldi | ..................... | 379/265.09 |
| 2010/0145678 A1* | 6/2010 | Csomai et al. | .................... | 704/9 |

OTHER PUBLICATIONS

Zhang et al. "Opinion Retrieval from Blogs", Proceeding CIKM '07 Proceedings of the sixteenth ACM conference on Conference on information and knowledge management, pp. 831-840, 2007.*

(Continued)

*Primary Examiner* — Jialong He
(74) *Attorney, Agent, or Firm* — Dentons US LLP (57) ABSTRACT

A system, computer readable storage medium storing instructions, and computer-implemented method for determining sentiment expressed in documents is disclosed. A document is received from a plurality of documents. A sentence in the document that includes at least one sentiment signature within a predetermined distance of at least one keyword from a list of keywords is identified, wherein the list of keywords is extracted from the plurality of documents and is filtered using a phase transition formula, and wherein the at least one sentiment signature corresponds to an expression of at least one sentiment in the sentence. At least one category corresponding to the at least one keyword of the sentence is determined, wherein the at least one category is included in a list of categories that is generated using the list of keywords. At least one sentiment corresponding to the at least one category is determined based on the at least one sentiment signature.

18 Claims, 7 Drawing Sheets

(56) References Cited

OTHER PUBLICATIONS

Tan et al. "Combining Learn-based and Lexicon-based Techniques for Sentiment Detection without Using Labeled Examples", Proceeding SIGIR '08 Proceedings of the 31st annual international ACM SIGIR conference on Research and development in information retrieval, pp. 743-744, 2008.*

Robertson, "Understanding Inverse Document Frequency: On theoretical arguments for IDF", Journal of Documentation 60 No. 5, pp. 503-520, 2004.*

Aizawa, "An information-theoretic perspective of tf—idf measures", Information Processing and Management 39, pp. 45-65, 2003.*

* cited by examiner

SYSTEM AND METHOD FOR DETERMINING SENTIMENT EXPRESSED IN DOCUMENTS

RELATED APPLICATIONS

This application claims priority under 35 U.S.C. §119 to U.S. Provisional Patent Application No. 61/284,820 filed 24 Dec. 2009, entitled "Sentiment Platform," by inventor Minh Doung-van. This application also claims priority under 35 U.S.C. §119 to U.S. Provisional Patent Application No. 61/284,819 filed 24 Dec. 2009, entitled "Mobile Sentiment Platform," by inventor Minh Doung-van. This application also claims priority under 35 U.S.C. §119 to U.S. Provisional Patent Application No. 61/393,813 filed 15 Oct. 2010, entitled "Sentiment Engine," by inventor Minh Doung-van, which applications are incorporated by reference herein in their entirety.

TECHNICAL FIELD

The disclosed embodiments relate generally to determining sentiment expressed in documents.

BACKGROUND

The Internet includes information on various subjects. This information may be written by experts in a particular field or casual users (e.g., bloggers, reviewers, etc.). Search engines allow users to identify documents including information on subjects of interest for the users. However, it is presently difficult to identify sentiment expressed by these users on particular subjects (e.g., the quality of rooms at a particular hotel).

BRIEF DESCRIPTION OF THE DRAWINGS

Like reference numerals refer to corresponding parts throughout the drawings.

DESCRIPTION OF EMBODIMENTS

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

The embodiments described herein provide techniques for determining sentiment expressed in documents.

Figure 1:
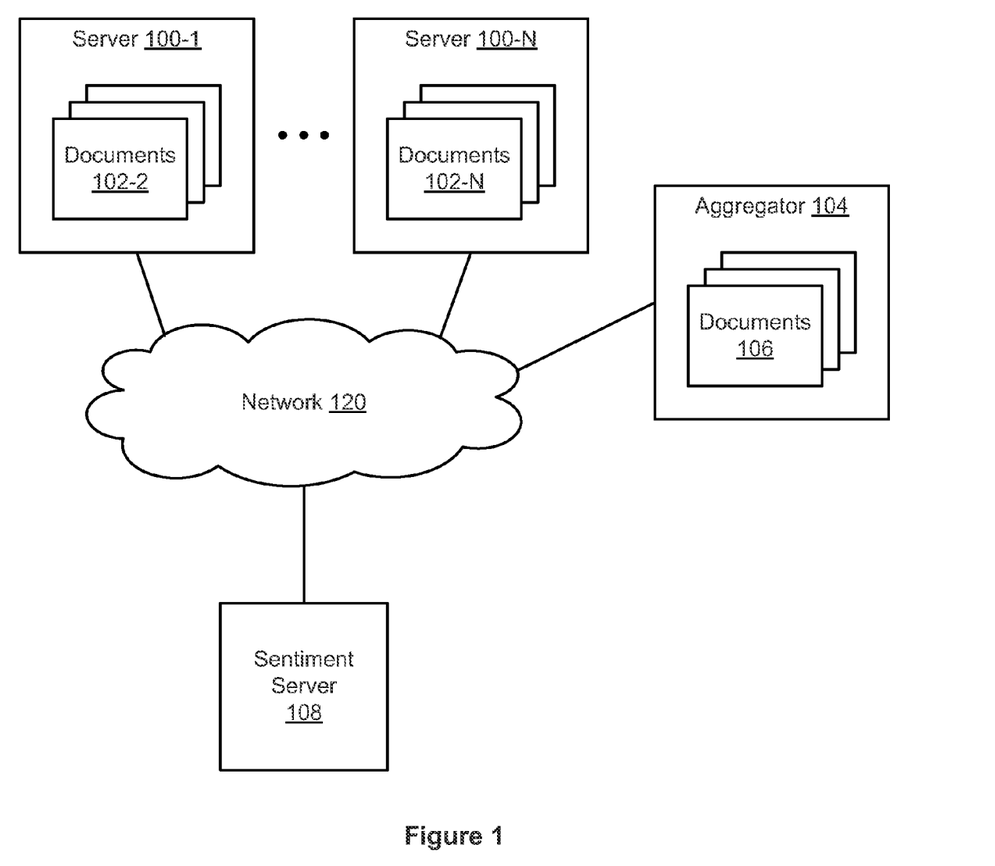
FIG. 1 is a block diagram illustrating network, according to some embodiments.

FIG. 1 is a block diagram illustrating network 120, according to some embodiments. Network 120 can generally include any type of wired or wireless communication channel capable of coupling together computing nodes. This includes, but is not limited to, a local area network, a wide area network, or a combination of networks. In some embodiments, network 120 includes the Internet.

in some embodiments, servers 100 are coupled to network 120. The server 100 may include documents 102. The documents 102 may be any type of document, including, but not limited to, a web document (e.g., hypertext markup language (HTML) document, an extensible markup language (XML) document, etc.), a text document, a spreadsheet, a presentation, a scanned document (e.g., scanned text, etc.), an image, and the like.

In some embodiments, an aggregator 104 is coupled to the network 120. The aggregator 104 may include documents 106. In some embodiments, the aggregator 104 obtains at least a subset of the documents 102 from the servers 100. For example, the aggregator 104 may crawl the servers 100 and retrieve at least a subset of the documents 102 from the servers 100.

In some embodiments, a sentiment server 108 is coupled to the network 120. The sentiment server 108 is configured to determine sentiment expressed in documents, as described herein. The documents used by the sentiment server 108 may include documents obtained from the servers 100 (e.g., by crawling the servers 100), documents obtained from the aggregator 104 by purchasing documents from the aggregator 104), or a combination thereof.

Figure 2:
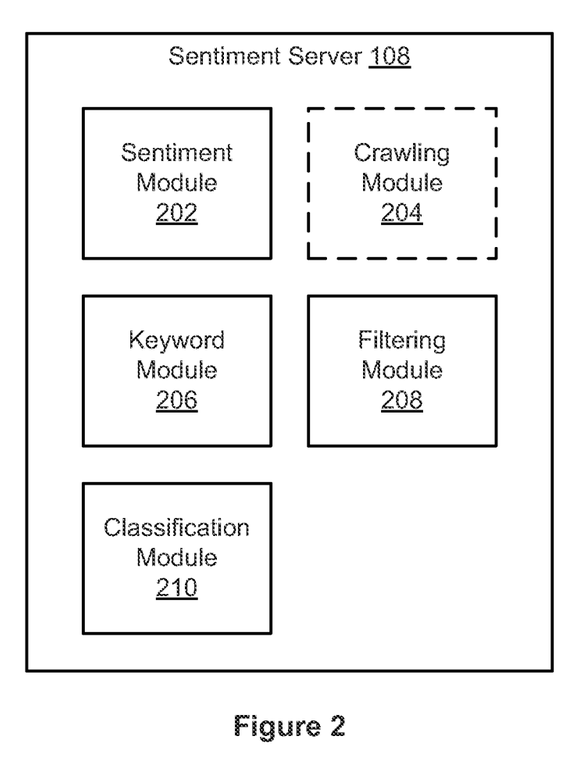
FIG. 2 is a block diagram illustrating a sentiment server, according to some embodiments.

FIG. 2 is a block diagram illustrating the sentiment server 108, according to some embodiments. The sentiment server 108 includes a sentiment module 202 configured to determine sentiment expressed in documents, a crawling module 204 (optional) configured to crawl servers 100 to obtain at least a subset of the documents 102, a keyword module 206 configured to extract keywords from documents, a filtering module 208 configured to filter keywords and documents, and a classification module 210 configured to classify documents, sentences, and/or keywords. Note that the functionality of these modules may be combined. For example, the sentiment module 202 may include the functionality of the keyword module 206 and the filtering module 208. These modules are described in more detail with respect to FIGS. 3-9 below.

Determining Sentiment Expressed in a Document

Figure 3:
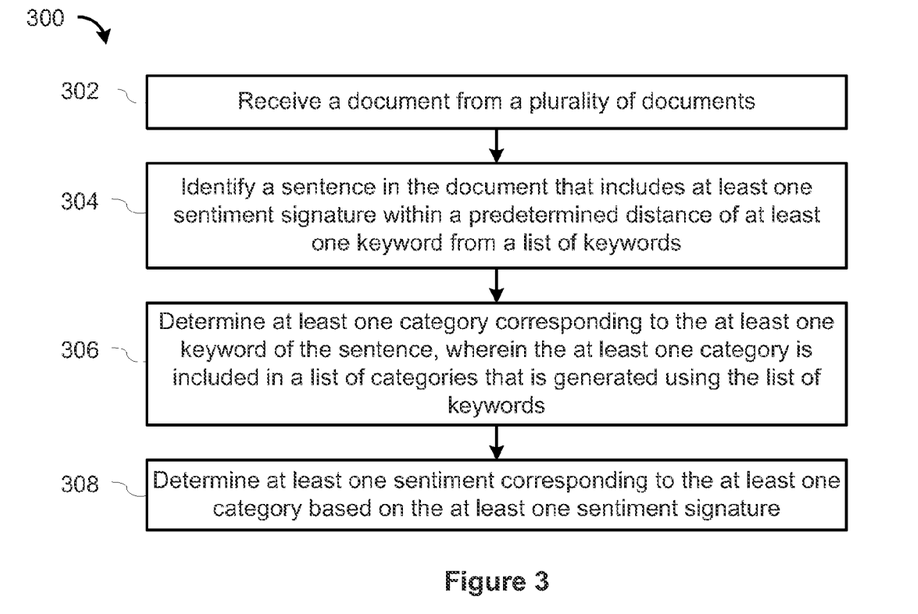
FIG. 3 is a flowchart of a method for determining sentiment expressed in a document, according to some embodiments.

FIG. 3 is a flowchart of a method 300 for determining sentiment expressed in a document, according to some embodiments. The sentiment module 202 receives (302) a document from a plurality of documents. For example, the plurality of documents may include at least a subset of the documents 102, at least a subset of the documents 106, or a combination thereof. The process of selecting the plurality of documents is described in more detail below with respect to FIG. 9.

The sentiment module 202 then identifies (304) a sentence in the document that includes at least one sentiment signature within a predetermined distance of at least one keyword from a list of keywords. The at least one sentiment signature corresponds to an expression of at least one sentiment in the sentence. In some embodiments, the at least one sentiment signature includes at least one word (e.g., an adjective) indicating that the expression of the at least one sentiment exists in the sentence. In some embodiments, the sentiment signature is associated with a polarity. For example, the polarity may indicate that the sentiment signature reflects a positive sentiment, a negative sentiment, or a neutral sentiment.

Note that the sentiment module 202 may identify grammatical units larger or smaller than a sentence. For example, the sentiment module 202 may identify a paragraph or a phrase that includes at least one sentiment signature within the predetermined distance of at least one keyword.

In some embodiments, the list of keywords is extracted from the plurality of documents and is filtered using a phase transition formula. These embodiments are described in more detail with respect to FIG. 4 below.

In some embodiments, the at least one sentiment signature is included in a list of sentiment signatures. The list of sentiment signatures may be generated manually.

The classification module 210 then determines (306) at least one category corresponding to the at least one keyword of the sentence. In some embodiments, the at least one category is associated with a product, a service, or a combination thereof. The process of determining the at least one category corresponding to the at least one keyword of the sentence is described in more detail with respect to FIGS. 7 and 8 below. In some embodiments, the at least one category is included in a list of categories that is generated using the list of keywords. These embodiments are described in more detail below with respect to FIGS. 5 and 6 below.

The sentiment module 202 then determines (308) at least one sentiment corresponding to the at least one category based on the at least one sentiment signature. In some embodiments, the at least one sentiment is an expression of an opinion relating to at least one category.

Figure 4:
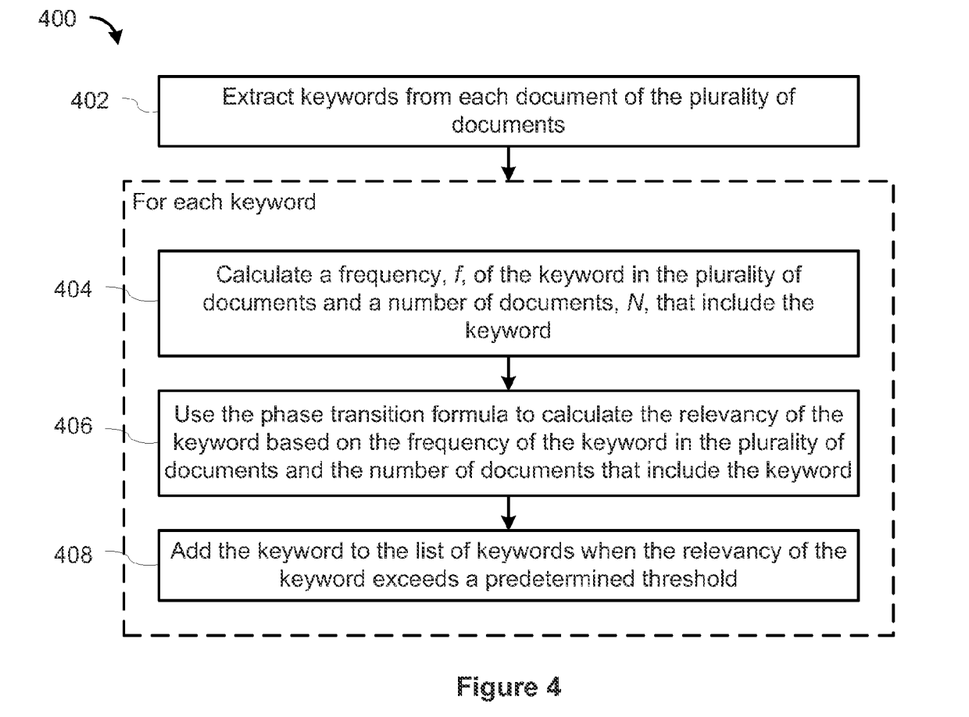
FIG. 4 is a flowchart of a method for extracting a list of keywords, according to some embodiments.

To clarify the process described with respect to FIG. 3, consider an exemplary document that includes an exemplary sentence: "The room was stinky and the carpets were dirty." Assume that the words "stinky" and "dirty" are sentiment signatures expressing a negative sentiment (e.g., a negative polarity), the words "room" and "carpets" are keywords, and that the predetermined distance is 3. The sentiment module 202 identifies (304) this exemplary sentence because the sentiment signature "stinky" is two words away from the keyword "room" and the sentiment signature "dirty" is two words away from the keyword "carpets." The classification module 210 then determines (306) the category corresponding to the keywords of the sentence. In this example, the classification module 210 may determine that "hotel room" is the category for the keyword of the sentence. The sentiment module 202 then determines (308) that the sentiment expressed about the hotel room (e.g., the category) is a negative sentiment Extracting a List of Keywords In some embodiments, prior to identifying (304) the sentence in the document that includes the at least one sentiment signature within the predetermined distance of the at least one keyword from the list of keywords, the keyword module 206 extracting the list of keywords from the plurality of documents. FIG. 4 is a flowchart of a method 400 for extracting the list of keywords, according to some embodiments.

The keyword module 206 extracts (402) keywords from each document of the plurality of documents.

For each keyword, the keyword module 206 performs the following operations. The keyword module 206 calculates (404) a frequency, f, of the keyword in the plurality of documents and a number of documents, N, that include the keyword. Next, the keyword module 206 uses (406) a phase transition formula to calculate the relevancy of the keyword based on the frequency of the keyword in the plurality of documents and the number of documents that include the keyword. In some embodiments, the phase transition formula is $$\frac{f}{N^x},$$

where $x \geq 1$. In some embodiments, x is 3. The keyword module 206 then adds (408) the keyword to the list of keywords when the relevancy of the keyword exceeds a predetermined threshold.

Generating a List of Categories

In some embodiments, prior to determining (306) the at least one category corresponding to the at least one keyword of the sentence, the classification module 210 generates the list of categories.

Figure 5:
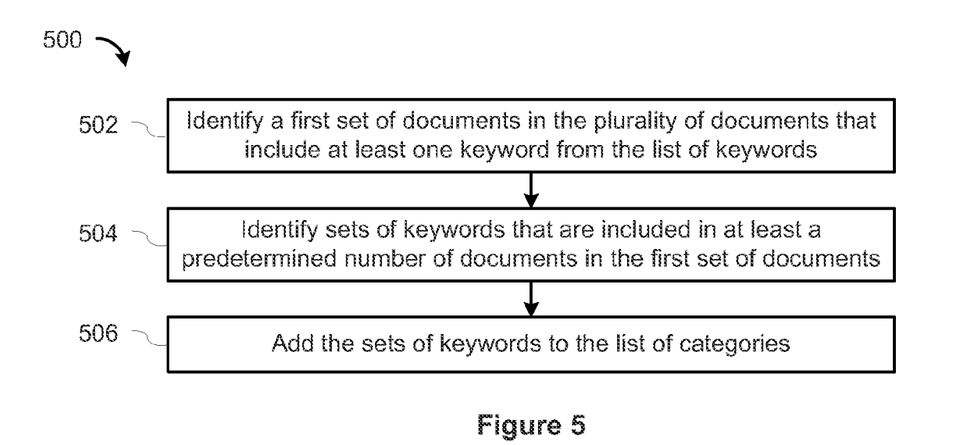
FIG. 5 is a flowchart of a method for generating a list of categories, according to some embodiments.

FIG. 5 is a flowchart of a method 500 for generating a list of categories, according to some embodiments. The classification module 210 identifies (502) a first set of documents in the plurality of documents that include at least one keyword from the list of keywords. Next, the classification module 210 identifies (504) sets of keywords that are included in at least a predetermined number of documents in the first set of documents. The classification module 210 then adds (506) the sets of keywords to the list of categories, wherein a respective category includes a respective set of keywords. Thus, in these embodiments, the classification module 210 determines categories by identifying keywords that appear in at least the predetermined number of documents.

Figure 6:
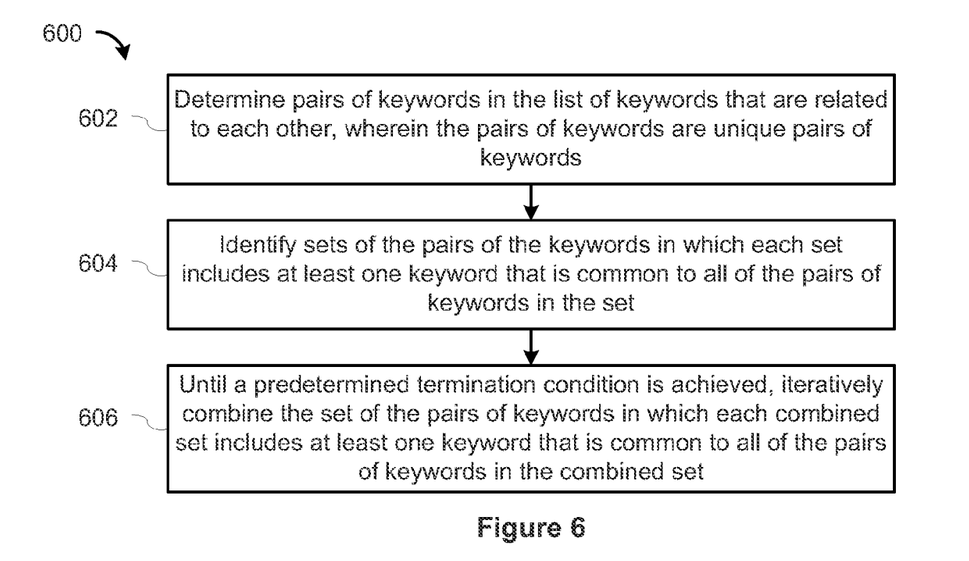
FIG. 6 is a flowchart of another method for generating a list of categories, according to some embodiments.

FIG. 6 is a flowchart of a method 600 for generating a list of categories, according to some embodiments. The classification module 210 determines (602) pairs of keywords in the list of keywords that are related to each other, wherein the pairs of keywords are unique pairs of keywords. Next, the classification module 210 identifies (604) sets of the pairs of the keywords in which each set includes at least one keyword that is common to all of the pairs of keywords in the set. Until a predetermined termination condition is achieved, the classification module 210 then iteratively combines (606) the set of the pairs of keywords in which each combined set includes at least one keyword that is common to all of the pairs of keywords in the combined set. Thus, in these embodiments, the classification module 210 determines sets of keywords that are related to each other and iteratively combines the pairs (or larger groups of keywords) to form the categories. For example, the classification engine 210 may identify the following pairs of keywords from the list of keywords: {Paris, Romance}, {Paris, City of Love}, {Paris, French}, {Dog, Beagle}, {Cat, Siamese}. The classification engine 210 may then determine that {Paris, Romance, City of Love, French} is a set of related keywords (e.g., a category) because the word "Paris" is common to the pairs {Paris, Romance}, {Paris, City of Love}, {Paris, French}, Note that the classification engine 210 may also determine that {Paris, Romance, City of Love} is a set of related keywords. The number of keywords that are associated with a particular category may depend on several factors, including, but not limited to, an amount of specificity desired (e.g., a category including 4 keywords is more specific that a category including 3 keywords), a number of documents that are associated with the particular category, and a number of sentences that are associated with the particular category, and the like. In some embodiments, the predetermined termination condition is determined by the level of specificity desired for a category. The more keywords that are used to describe the category, the more specific the category is (e.g., {Paris, Romance, City of Love, French} is more specific than {Paris, Romance, City of Love}).

Determining Categories Corresponding to Keywords

Several techniques may be used to determine categories corresponding to keywords.

In some embodiments, the classification module 210 determines (306) the at least one category corresponding to the at least one keyword of the sentence using a support vector machine.

In some embodiments, the classification module 210 determines (306) the at least one category corresponding to the at least one keyword of the sentence using a neural network.

Figure 7:
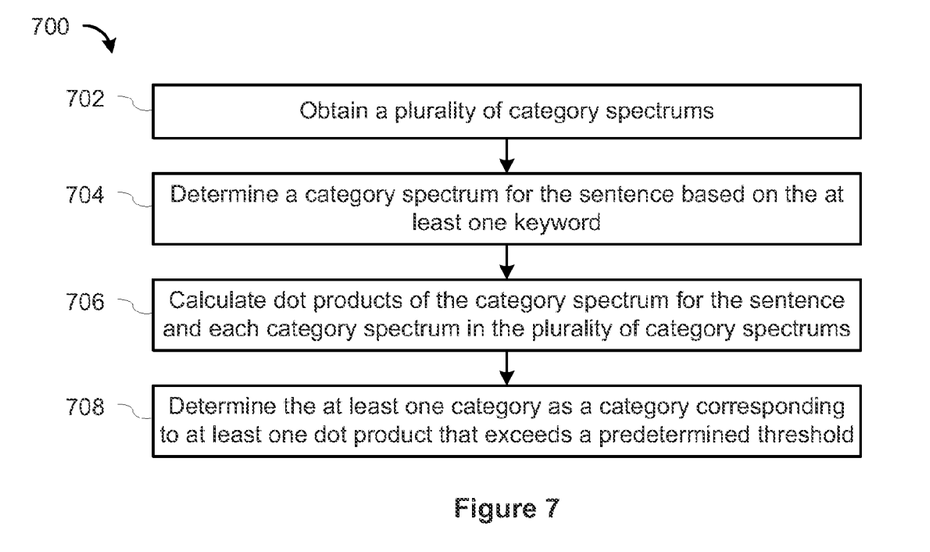
FIG. 7 is a flowchart of another method for determining at least one category corresponding to at least one keyword of a sentence, according to some embodiments.

FIG. 7 is a flowchart of a method 700 for determining at least one category corresponding to at least one keyword of a sentence, according to some embodiments. The classification module 210 obtains (702) a plurality of category spectrums, a respective category spectrum including a frequency of occurrence of keywords in the list of keywords that corresponds to a respective category.

Next, the classification module 210 determines (704) a category spectrum for the sentence based on the at least one keyword. In some embodiments, the classification module 210 normalizes the category spectrum for the sentence. The classification module 210 then calculates (706) dot products of the category spectrum for the sentence and each category spectrum in the plurality of category spectrums. The classification module 210 then determines (708) the at least one category as a category corresponding to at least one dot product that exceeds a predetermined threshold, Note that a category spectrum may be represented by the pair {WordID, Frequency}, where the value of WordID corresponds to a unique keyword and Frequency corresponds to a frequency of occurrence of the keyword corresponding to the WordID. For example, the keyword "Paris" may have a WordID of 8 and a frequency of occurrence of 1002. Thus, the category spectrum includes a pair {8, 1002}. Also note that the category spectrum may be visually represented. For example, on a 2D plot, the x-axis may be WordID and the y-axis may be Frequency. Also note that the dot product of two category spectrums is the sum of the products of the frequency of occurrence of the keywords for each WordID $$\left(\text{e.g.,} \sum_{i} (Frequency_{1i} \cdot Frequency_{2i})\right),$$

where i corresponds to the WordID, $Frequency_{1i}$ is the frequency of occurrence of the keyword corresponding to the WordID i for the first category, and $Frequency_{2i}$ is the frequency of occurrence of the keyword corresponding to the WordID i for the second category).

Figure 8:
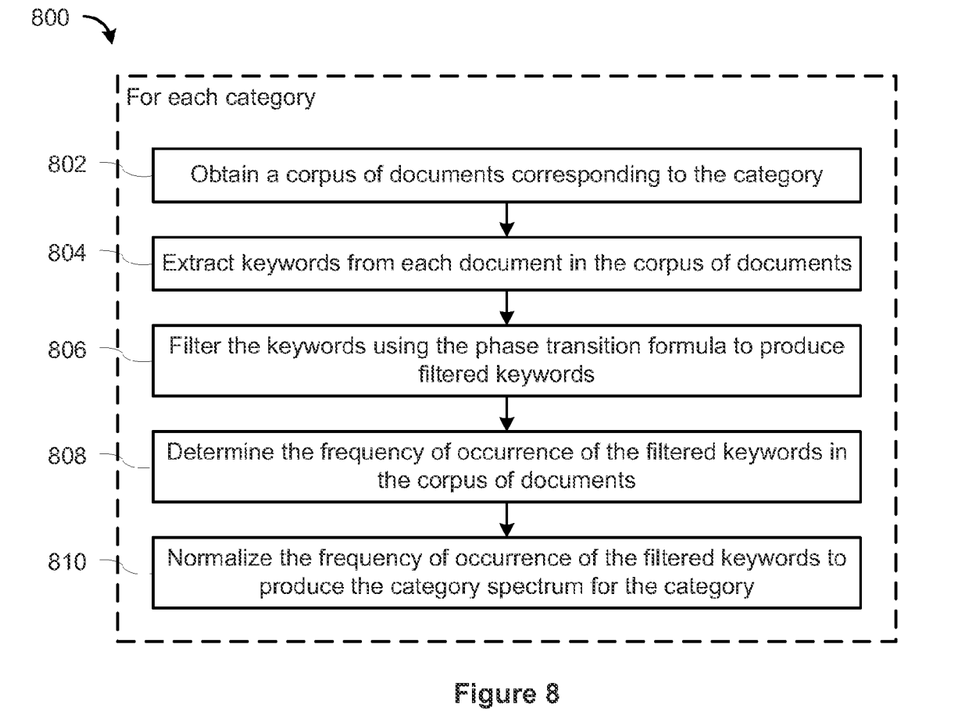
FIG. 8 is a flowchart of a method for determining a category spectrum for a category, according to some embodiments.

In some embodiments, prior to obtaining the plurality of category spectrums, the classification module 210 determines a category spectrum for each category. FIG. 8 is a flowchart of a method 800 for determining a category spectrum for a category, according to some embodiments. The classification module 210 obtains (802) a corpus of documents corresponding to the category. Next, the classification module 210 extracts (804) keywords from each document in the corpus of documents. The classification module 210 then filters (806) the keywords using the phase transition formula to produce filtered keywords. Next, the classification module 210 determines (808) the frequency of occurrence of the filtered keywords in the corpus of documents. In some embodiments, the frequency of occurrence of each keyword is divided by the total count of the keyword seen in the entire corpus, across all categories. In some embodiments, a threshold is then applied to the resulting category spectrum. In these embodiments, if the amplitude of the total count of the keyword within a category divided by the total keyword word count across all categories is greater than a predetermined threshold, the amplitude may be reset by a formula or an algorithm to a new value. In some embodiments, a threshold is then applied to the resulting spectrum. In these embodiments, if the amplitude of the keyword count within a category divided by the total page count where that keyword occurs across all categories is greater than a predetermined threshold, the amplitude may be reset by a formula or algorithm to a new value. The new value truly be set to zero to eliminate common words that are very commonly used across all categories.

The classification module 210 then normalizes (810) the frequency of occurrence of the filtered keywords to produce the category spectrum for the category. In some embodiments, the category spectrum is normalized so that area under each of the category spectrums is the same. Doing so reduces comparative bias between categories.

Selecting Documents

Figure 9:
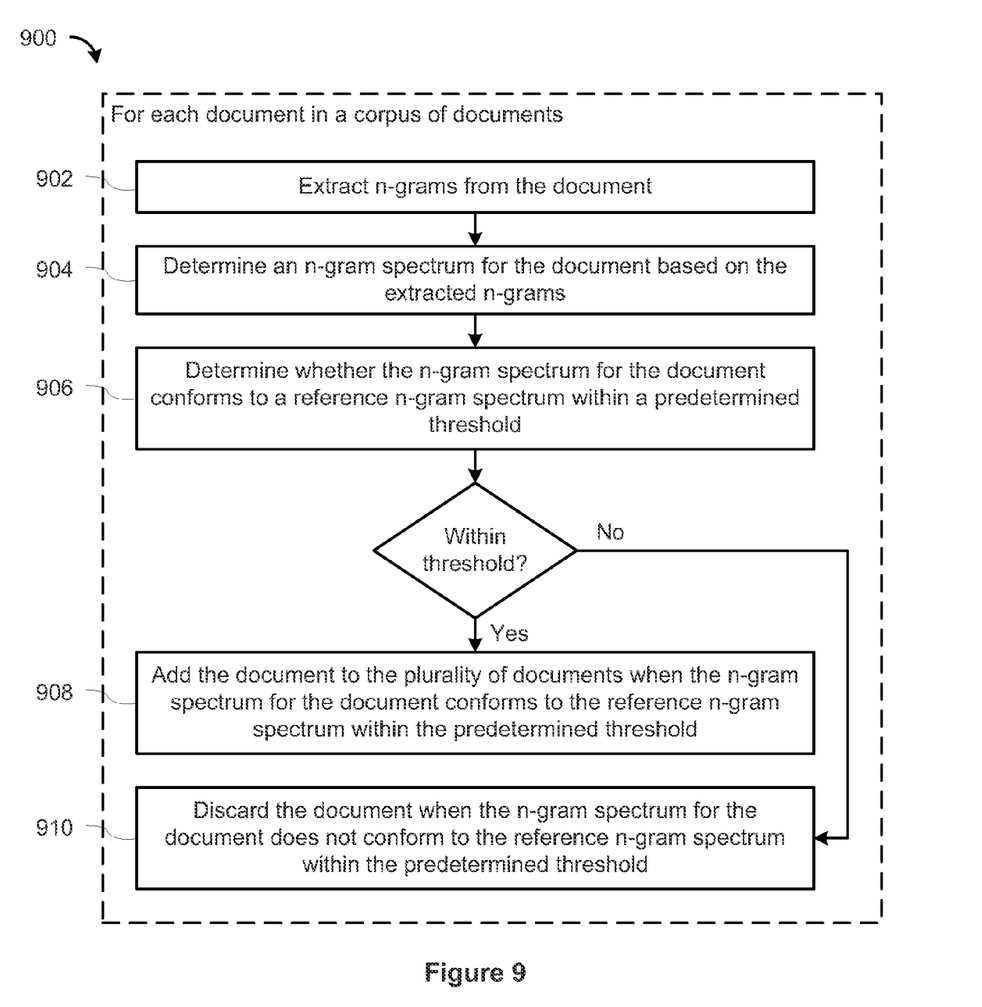
FIG. 9 is a flowchart of a method for selecting a plurality of documents from a corpus of documents, according to some embodiments.

The documents 102 and/or the documents 106 may include documents that contain little or no value. For example, the documents 102 and/or the documents 106 may include documents generated by machines to enhance search engine rankings. Documents generated by machines typically do not include expressions of sentiment. It is often desirable to fitter out these types of documents. Thus, in some embodiments, prior to receiving the document from the plurality of documents, the filtering module 208 selects the plurality of documents from a corpus of documents. FIG. 9 is a flowchart of a method 900 for selecting the plurality of documents from the corpus of documents, according to some embodiments. For each document in the corpus of documents, the filtering module 208 performs the following operations. The filtering module 208 extracts (902) n-grams from the document. Next, the filtering module 208 determines (904) an n-gram spectrum for the document based on the extracted n-grams, wherein the n-gram spectrum indicates a frequency of occurrence of n-grams as a function of a size of n-grams. The filtering module 208 then determines (906) whether the n-gram spectrum for the document conforms to a reference n-gram spectrum within a predetermined threshold, wherein the reference n-gram spectrum is defined by a predetermined equation. In some embodiments, the predetermined equation is $cx^{-a} \cdot e^{-bx}$, wherein x is the size of the n-gram, and wherein a, b, and c are predetermined values that place a peak of the predetermined equation between an n-gram of size 2 and an n-gram of size 3. In some embodiments, the value of b is between 1 and 2, and the value of c is between 1 and 2. The filtering module 208 adds (908) the document to the plurality of documents when the n-gram spectrum for the document conforms to the reference n-gram spectrum within the predetermined threshold. The filtering module 208 discards (910) the document when the n-gram spectrum for the document does not conform to the reference n-gram spectrum within the predetermined threshold.

Exemplary Computer System

Figure 10:
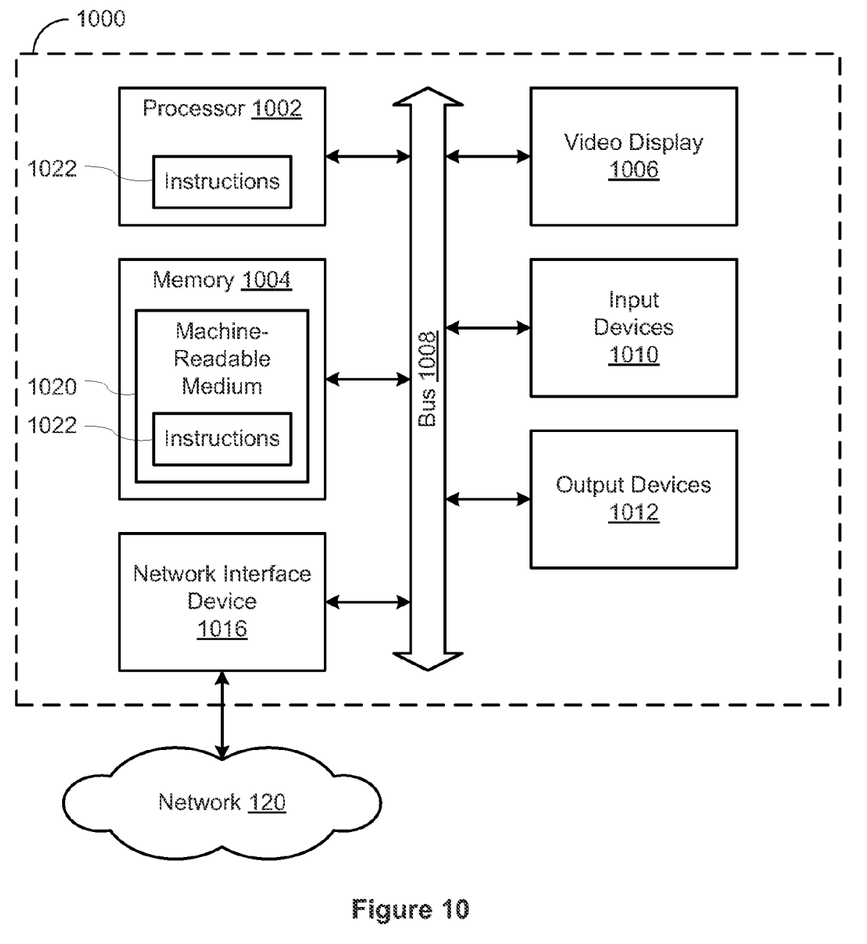
FIG. 10 is a block diagram of a machine, according to some embodiments.

FIG. 10 depicts a block diagram of a machine in the example form of a computer system 1000 within which may be executed a set of instructions for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment or as a peer machine in a peer-to-peer (pr distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the computer system 1000 includes a processor 1002 (e.g., a central processing unit (CPU), a graphics processing unit (GPU) or both), and memory 1004, which communicate with each other via bus 1008. Memory 1004 includes volatile memory devices (e.g., DRAM, SRAM, DDR RAM, or other volatile solid state memory devices), non-volatile memory devices (e.g., magnetic disk memory devices, optical disk memory devices, flash memory devices, tape drives, or other non-volatile solid state memory devices), or a combination thereof. Memory 1004 may optionally include one or more storage devices remotely located from the computer system 1000. The computer system 1000 may further include video display unit 1006 (e.g., a plasma display, a liquid crystal display (LCD) or a cathode ray tube (CRT)). The computer system 1000 also includes input devices 1010 (e.g., keyboard, mouse, trackball, touchscreen display, etc.), output devices 1012 (e.g., speakers), and a network interface device 1016. The aforementioned components of the computer system 1000 may be located within a single housing or case (e.g., as depicted by the dashed lines in FIG. 10). Alternatively, a subset of the components may be located outside of the housing. For example, the video display unit 1006, the input devices 1010, and the output device 1012 may exist outside of the housing, but be coupled to the bus 1008 via external ports or connectors accessible on the outside of the housing.

Memory 1004 includes a machine-readable medium 1020 on which is stored one or more sets of data structures and instructions 1022 (e.g., software) embodying or utilized by any one or more of the methodologies or functions described herein. The one or more sets of data structures may store data. Note that a machine-readable medium refers to a storage medium that is readable by a machine (e.g., a computer-readable storage medium). The data structures and instructions 1022 may also reside, completely or at least partially, within memory 1004 and/or within the processor 1002 during execution thereof by computer system 1000, with memory 1004 and processor 1002 also constituting machine-readable, tangible media.

The data structures and instructions 1022 may further be transmitted or received over a network 120 via network interface device 1016 utilizing any one of a number of well-known transfer protocols (e.g., HyperText Transfer Protocol (HTTP)). Network 120 can generally include any type of wired or wireless communication channel capable of coupling together computing nodes (e.g., the computer system 1000). This includes, but is not limited to, a local area network, a wide area network, or a combination of networks. In some embodiments, network 120 includes the Internet Certain embodiments are described herein as including logic or a number of components, modules, or mechanisms. Modules may constitute either software modules (e.g., code and/or instructions embodied on a machine-readable medium or in a transmission signal) or hardware modules. A hardware module is a tangible unit capable of performing certain operations and may be configured or arranged in a certain manner. In example embodiments, one or more computer systems (e.g., the computer system 1000) or one or more hardware modules of a computer system (e.g., a processor 1002 or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor 1002 or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor 1002 configured using software, the general-purpose processor 1002 may be configured as respective different hardware modules at different times. Software may accordingly configure a processor 1002, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors 1002 that are temporarily configured (e.g., by software, code, and/or instructions stored in a machine-readable medium) or permanently configured to perform the relevant operations. Whether temporarily or permanently configured, such processors 1002 may constitute processor-implemented (or computer-implemented) modules that operate to perform one or more operations or functions. The modules referred to herein may, in some example embodiments, comprise processor-implemented (or computer-implemented) modules.

Moreover, the methods described herein may be at least partially processor-implemented (or computer-implemented) and/or processor-executable (or computer-executable). For example, at least some of the operations of a method may be performed by one or more processors 1002 or processor-implemented (or computer-implemented) modules. Similarly, at least some of the operations of a method may be governed by instructions that are stored in a computer readable storage medium and executed by one or more processors 1002 or processor-implemented (or computer-implemented) modules. The performance of certain of the operations may be distributed among the one or more processors 1002, not only residing within a single machine, but deployed across a number of machines. In some example embodiments, the processors 1002 may be located in a single location (e.g., within a home environment, an office environment or as a server farm), while in other embodiments the processors 1002 may be distributed across a number of locations.

While the embodiment(s) is (are) described with reference to various implementations and exploitations, it will be understood that these embodiments are illustrative and that the scope of the embodiment(s) is not limited to them. In general, the embodiments described herein may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the embodiment(s).

Exemplary Embodiment

The following discussion includes a non-limiting exemplary embodiment for determining sentiment expressed in documents.

A. An initial list of seed words (SeedWordList) is formed to help identify relevant corpus texts. A list of seed keywords for a particular subject is obtained from sources including, but not limited to subject glossaries and from subject-matter experts.

B. Source text from documents in the corpus is obtained. For example, the corpus may include documents from websites (e.g., Hogs, review websites, etc.). The words in each document are compared with the SeedWordList. If the number and/or proportion of words in the documents that match the members of the SeedWordList meet or exceed a predetermined threshold, the document is added to the PassedDocumentList. Otherwise, the document is discarded.

C. The initial SeedWordList is expanded by combining the words from the SeedWordList with a list of words that result from extracting the keywords and N-grams from documents in the PassedDocumentList (e.g., using standard keyword extraction and N-gram extraction tools). The keywords and N-grams are further refined before combining the result of the SeedWordList with the process described below that calculates the Node Structure of selected documents.

D. The Node Structure of the documents is created to improve the initial set of keywords and N-grams. This process involves the extraction of information from words (e.g., in text format) in order to create a multi-fractal data structure. A multi-fractal data structure is a data structure one that exhibits scale within scale. The patterns at one scale may be slightly different than the ones seen at another scale. Once the data is extracted and its multi-fractal structure determined, the data-structure can be stored in memory so that a computer can access and perform computations with the data-structure. This data structure represents a natural structure of the information and is useful for identifying relevant information efficiently. The data structure is assembled as follows:

1. Make a list of k seed category names words (the SeedWordList).

2. Put each of the k category name words, into a crawler to retrieve N(k) web pages from each of the k category name words.

3. Take each of the N(k) pages and make a list of the unique words and count the number of times they occur on each page (word frequencies). Note that stop words (e.g., "the", "his", "and", etc.) are removed in this step. Furthermore, the number of words may be reduced to nouns and adjacent adjectives.

4. Take M (e.g., 10), of the most frequent words from each of the N(k) pages and assign indexes (e.g., 1,2,3,4,5,6,7,8,9, and 10) to the most frequent words for the first page, assign indexes (e.g., 11,13, . . . , 21) to the most frequent words for the second page, and so on, until the N(1) pages from the first category are exhausted. Permit sequences of words to be identified by a single index (referred to as subject groups). Repeat for the N(2) pages of the second the category name, and continue until all k categories are exhausted.

5. Calculate the sums of M for each of the N(k) pages for all k and name the value NWords.

6. Make a graph with a horizontal, x, and vertical, y, axes.

7. Create a zero-filled NWords by NWords matrix called W.

8. Take the word data from the first web page and calculate word link coefficients using the following method:

a. For each of the listed most frequent words create a unique pair (x,v), called a word link, where x is not the same word as y.

b. Combine the word link with a page link coefficient so that higher word link and page link coefficients corresponding to higher selection scores than those with lower word link and page link coefficients. The page link coefficient arises from analyzing the link structure and content of the page links coming into the web page. The selection score is a value used to pick the tags from the data. If the page link coefficient is unavailable it should be set to a default value such as 1.0.

9. For computational purposes do the following:

a. Store the word coefficient for word link coefficients in the (x,y)=(1,3), (1,4), . . . (1,M+1) in the xth column and yth row of matrix W. The x and y are the word indices from the list defined above.

b. Repeat the process for (x,y)=(2,3), . . . (2,M+1) and finally for the (M)th and (M+1)th words, (x,y)=(M,M+1). For the second category of pages the first coefficient entry is (x,y)=(M+2,M+3). Each of the coefficient entries represent the connectivity of two words that are found or associated with each other from a document.

c. Repeat step 9b for all of the pages of all of the subjects except for the following situation:

i. Whenever a current word can be found in a prior x word index, all of the coefficients are combined with the coefficient found the prior index in such a way that combinations of the larger coefficients tend to be greater than combinations of smaller coefficients. For example, if the word "dog" corresponds to word index 4 with that has a (4,8) word coefficient of and the word "dog" occurs again on another page with index 25 with a (25,8) word coefficient of W2, then all of connectivity coefficients for index 25 are combined to the x value for index 4 for each of the corresponding y's. In this case it would be W(4,8) would be combined with W(25,8) and the result would get assigned to the new W(4,8). After the transferring and combining the coefficients are complete, W(25,8) is set to a small value such as 0,0. This rule applies for all other instances of "dog" that occur after the first instance.

ii. Duplicated words found on the y word index can be combined into the original)) word index in a same or similar way to what was done for the x word indices. If they are not combined, the influence of each word as a function of subject can be seen since each subject resides in some range of y indices.

10. Rank the words by calculating the word ranking scores from their respective word link coefficients in such a way that the word that has the most and highest word link coefficients ranks higher than a word with the fewest low word link coefficients.

a. Let R(i) be the ranking of a given word node.

b. Let W(i,j) be the connectivity coefficients between words     c. Calculate the following: for each i, R(i)=R(W(i,j)), the ranking as a function of the word link weights (which already include page ranking weights) over each j.

d. Select the words with the larger weights for tags or groups.

11. For visually analyzing the data graphically do the following:

a. Put a dot that is proportional to the score based on the word and page link coefficients on the (x,y)=(1,3), (1,4), . . . (1,M+1) coordinates. Do the same for (x,y)=(2,3), . . . (2, M+1) and finally for the Mth and (M+1)th words, (x,y)=(M, M+1). For the second category of pages the first dot will be (x,y)=(M+2,M+3). Each of the dots represent the connectivity of two words that are found or associated with each other from a document. The x and y axes are the word indices from the list defined above.

b. Repeat section 11a for all of the documents of all of the subjects except in the following situation:

i. Whenever a current word can be found in a prior index, all of the dots are recorded in the prior index. For example, if the word "dog" happens to be word index 4 and occurs again with index 25, then all of index 25's connectivity dots are translated to the x value of index 4. After a dot is translated, it is removed from its original position on the graph. This rule applies for all other instances of "dog" that occur after the first instance.

ii. Duplicated words found on the y word index can be combined into the original y word index in a same or similar way to what was done for the x word indices. If they are not combined, the influence of each word as a function of subject can be seen since each subject resides in some range of v indices.

c. Look for vertical stripes on the graph, the most prominent stripes correspond to the W1 indices of words that are selected as tag words or subject groups. The W1 words that have the most links, or dots should be selected for tag words or subject groups. Additional filtering on these words can be applied to narrow the list further.

E. The "tag words" or "subject groups" are combine with the SeedWordList to create the WorkingWordList.

F. The WorkingWordList is augmented by obtaining other documents (e.g., via crawling, obtaining documents from an aggregator, etc.) and steps C and D above to obtain a predetermined number (NumberOfAdditionalListExpansion) of additional documents more documents.

G. Step F is repeated until the rate of growth of the harvested N-grams slows to a satisfactory rate.

H. For the Sentiment Analysis Engine, a list of topics, adjectives, and proper nouns that are relevant to the subject is created. For example, if the subject is "hotels", topics/keywords may include: concierge, bathroom, bed, bedroom, front desk, television, room service, maid service, cleanliness, elevator, restaurant, reservations, and checkout. Adjectives may include: prompt, friendly, slow, rude, clean, dirty, helpful, awesome, terrible, stunning, confusing, disorganized, filthy, unhelpful. Proper nouns may include: Marriott, Hyatt, Four Seasons, Motel 6, Intercontinental, Quality Inn, Howard Johnson, etc.

I. Sentences that include both keywords and adjectives are identified for future analysis.

J. The keyword and adjective group are correlated with the subject of interest (e.g., the name of a hotel chain) by looking for the proper noun before and after the keyword and adjective group. The proper noun and keyword/adjective group are saved for future analysis and presentation.

K. For a review site the date is obtained and the site is revisited periodically. The period may be determined by identifying the dates of the blog and/or review entries, calculating the time periods between blog entries, and deciding how frequently to revisit the review site based on the time periods between blog entries. A constant time period (e.g., a minimum time period, one-third of the average time period, etc.) may be chosen. Alternatively, a variable time period dependent upon predetermined factors (e.g., seasons, etc.) may be chosen. For example, in the case of hotels, on our about a holiday such as the 4, of Jul. more entries may be posted and therefore, the period between crawls may be reduced around this time. A variable time period may also be chosen based on a local event (e.g., the Indianapolis 500). For example, in the case of hotels, the period between crawls for hotels that serve the Indianapolis 500 may decrease around the time of the event. Once the sampling time period is determined, the site is crawled for new text.

L. Time dependence may be made by category from each website.

M. A list of categories is obtained for a subject. A list of seed categories is obtained by looking at the headings on subject websites. The frequency of words on other subject websites is identified.

N. The importance of a review site is determined as follows:

a. The incoming links and the outgoing links of the review site are analyzed.

i. The legitimacy of the linked sites is checked to make sure that they are not SPAM links.

ii. The vocabulary distribution of the words on the linked sites is analyzed     iii. If the vocabulary spectra for the linked sites is not within a predetermined threshold of a reference vocabulary spectrum, the link is discarded.

b. The frequency of updates of blog entries or comments/ratings on the sites versus the time stamp deltas on the competing sites for a given subject is identified.

i. If the time stamps deltas are short, it means that the particular website has many people in the community actively reading and updating the site on a regular basis. The site that has the fastest legitimate comments is deemed the most important site in a community.

O. Suggestions from community members are identified as follows:

a. A list of patterns that identify a recommendation is created. For example, the pattern may include: "I recommend", "they could improve . . . ,", "I tell all my friends about . . . ", etc.

b. Subject keywords or N-grams in these sentences are identified.

c. Once the key word patterns are found, these sentences are stored as suggestions for each subject matter for presentation.

P. User interface for mobile devices a. The design of the user interface for seeing the ratings of the consumer sentiment of various products and services, for example hotel service, must be formatted for easy-to-use browsing, data entry, and retrieval of scoring. Graphs of various parameters vs. time in the form of X-Y charts or ranked problems in the form of Pareto charts need to fit within the screen of a smartphone. The horizontal or vertical scrolling to browse various data should be actuated by swiping a finger across the screen, mini trackball, thumb joystick, or by toggling user keys. The data can be a list snippets that contain the source statement from the blogs that reveal the sentiment, time dependent plots, and/or Pareto charts.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and its practical applications, to thereby enable others skilled in the art to best utilize the embodiments and various embodiments with various modifications as are suited to the particular use contemplated.

What is claimed is:

1. A computer-implemented method for determining sentiment expressed in a document, comprising:
 receiving a document from a plurality of documents;
 using at least one processor, identifying a sentence in the document that includes at least one sentiment signature within a predetermined distance of at least one keyword from a list of keywords, wherein the list of keywords is extracted from the plurality of documents and is filtered using a phase transition formula, wherein the phase transition formula is $f/N^x$, where f is a frequency of the keyword in the plurality of documents, N is a number of documents that include the keyword, and x>1, and wherein the at least one sentiment signature corresponds to an expression of at least one sentiment in the sentence;
 determining at least one category corresponding to the at least one keyword of the sentence, wherein the at least one category is included in a list of categories that is generated using the list of keywords;
 determining at least one sentiment corresponding to the at least one category based on the at least one sentiment signature.

2. The computer-implemented method of claim 1, wherein prior to identifying the sentence in the document that includes the at least one sentiment signature within the predetermined distance of the at least one keyword, the method further comprises extracting the list of keywords by:
 extracting keywords from each document of the plurality of documents;
 for each keyword,
  calculating a frequency, f, of the keyword in the plurality of documents and a number of documents, N, that include the keyword;
  using the phase transition formula to calculate the relevancy of the keyword based on the frequency of the keyword in the plurality of documents and the number of documents that include the keyword; and
  adding the keyword to the list of keywords when the relevancy of the keyword exceeds a predetermined threshold.

3. The computer-implemented method of claim 1, wherein x is 3.

4. The computer-implemented method of claim 1, wherein prior to determining the at least one category corresponding to the at least one keyword of the sentence, the method further comprises generating the list of categories by:
 identifying a first set of documents in the plurality of documents that include at least one keyword from the list of keywords;
 identifying sets of keywords that are included in at least a predetermined number of documents in the first set of documents; and
 adding the sets of keywords to the list of categories, wherein a respective category includes a respective set of keywords.

5. The computer-implemented method of claim 1, wherein prior to determining the at least one category corresponding to the at least one keyword of the sentence, the method further comprises generating the list of categories by:
 determining pairs of keywords in the list of keywords that are related to each other, wherein the pairs of keywords are unique pairs of keywords;
 identifying sets of the pairs of the keywords in which each set includes at least one keyword that is common to all of the pairs of keywords in the set; and
 until a predetermined termination condition is achieved, iteratively combining the set of the pairs of keywords in which each combined set includes at least one keyword that is common to all of the pairs of keywords in the combined set.

6. The computer-implemented method of claim 1, wherein determining the at least one category corresponding to the at least one keyword of the sentence includes using a support vector machine to determine the at least one category corresponding to the at least one keyword of the sentence.

7. The computer-implemented method of claim 1, wherein determining the at least one category corresponding to the at least one keyword of the sentence includes using a neural network to determine the at least one category corresponding to the at least one keyword of the sentence.

8. The computer-implemented method of claim 1, wherein determining the at least one category corresponding to the at least one keyword of the sentence includes:
 obtaining a plurality of category spectrums, a respective category spectrum including a frequency of occurrence of keywords in the list of keywords that corresponds to a respective category;
 determining a category spectrum for the sentence based on the at least one keyword;
 calculating dot products of the category spectrum for the sentence and each category spectrum in the plurality of category spectrums; and determining the at least one category as a category corresponding to at least one dot product that exceeds a predetermined threshold.

9. The computer-implemented method of claim 8, wherein prior to obtaining the plurality of category spectrums, the method further comprises for each category, determining a category spectrum for the category by:
   obtaining a corpus of documents corresponding to the category;
   extracting keywords from each document in the corpus of documents;
   filtering the keywords using the phase transition formula to produce filtered keywords;
   determining the frequency of occurrence of the filtered keywords in the corpus of documents; and
   normalizing the frequency of occurrence of the filtered keywords to produce the category spectrum for the category.

10. The computer-implemented method of claim 1, wherein prior to receiving the document from the plurality of documents, the method further comprises selecting the plurality of documents from a corpus of documents by:
   for each document in the corpus of documents,
      extracting n-grams from the document;
      determining an n-gram spectrum for the document based on the extracted n-grams, wherein the n-gram spectrum indicates a frequency of occurrence of n-grams as a function of a size of n-grams;
      determining whether the n-gram spectrum for the document conforms to a reference n-gram spectrum within a predetermined threshold, wherein the reference n-gram spectrum is defined by a predetermined equation;
      adding the document to the plurality of documents when the n-gram spectrum for the document conforms to the reference n-gram spectrum within the predetermined threshold; and
      discarding the document when the n-gram spectrum for the document does not conform to the reference n-gram spectrum within the predetermined threshold.

11. The computer-implemented method of claim 10, wherein the predetermined equation is $cx^{-a} \cdot e^{-bx}$, wherein x is the size of the n-gram, and wherein a, b, and c are predetermined values that place a peak of the predetermined equation between an n-gram of size 2 and an n-gram size 3.

12. The computer-implemented method of claim 1, wherein the at least one sentiment signature includes at least one word indicating that the expression of the at least one sentiment exists in the sentence.

13. The computer-implemented method of claim 1, wherein the at least one sentiment is an expression of an opinion relating to at least one category.

14. The computer-implemented method of claim 1, wherein the at least one category is associated with a product.

15. The computer-implemented method of claim 1, wherein the at least one category is associated with a service.

16. A system to determine sentiment expressed in a document, comprising:
   at least one processor;
   memory; and
   at least one program stored in the memory, the at least one program comprising instructions to:
   receive a document from a plurality of documents;
   identify a sentence in the document that includes at least one sentiment signature within a predetermined distance of at least one keyword from a list of keywords, wherein the list of keywords is extracted from the plurality of documents and is filtered using a phase transition formula, wherein the phase transition formula is $f/N^x$, where f is a frequency of the keyword in the plurality of documents, N is a number of documents that include the keyword, and x>1, and wherein the at least one sentiment signature corresponds to an expression of at least one sentiment in the sentence;
   determine at least one category corresponding to the at least one keyword of the sentence, wherein the at least one category is included in a list of categories that is generated using the list of keywords; and
   determine at least one sentiment corresponding to the at least one category based on the at least one sentiment signature.

17. The system of claim 16, wherein further comprising instructions to extract the list of keywords, wherein the instructions to extract the list of keywords from the document include instructions to:
   extract keywords from each document of the plurality of documents;
   for each keyword,
      calculate a frequency, f, of the keyword in the plurality of documents and a number of documents, N, that include the keyword;
      use the phase transition formula to calculate the relevancy of the keyword based on the frequency of the keyword in the plurality of documents and the number of documents that include the keyword; and
      add the keyword to the list of keywords when the relevancy of the keyword exceeds a predetermined threshold.

18. A computer readable storage device storing at least one program configured for execution by a computer, the at least one program comprising instructions to:
   receive a document from a plurality of documents;
   identify a sentence in the document that includes at least one sentiment signature within a predetermined distance of at least one keyword from a list of keywords, wherein the list of keywords is extracted from the plurality of documents and is filtered using a phase transition formula, wherein the phase transition formula is $f/N^x$, where f is a frequency of the keyword in the plurality of documents, N is a number of documents that include the keyword, and x>1, and wherein the at least one sentiment signature corresponds to an expression of at least one sentiment in the sentence;
   determine at least one category corresponding to the at least one keyword of the sentence, wherein the at least one category is included in a list of categories that is generated using the list of keywords; and
   determine at least one sentiment corresponding to the at least one category based on the at least one sentiment signature.

* * * * *